US008320290B2

(12) United States Patent
Chao et al.

(10) Patent No.: US 8,320,290 B2
(45) Date of Patent: Nov. 27, 2012

(54) EVOLVED MULTIMEDIA BROADCAST/MULTICAST SERVICE ACCESS GATEWAY, BASE STATION AND METHODS THEREOF

(75) Inventors: Hua Chao, Shanghai (CN); Yonggang Wang, Shanghai (CN); Yu Chen, Shanghai (CN); He Wang, Shanghai (CN); Zhongji Hu, Shanghai (CN)

(73) Assignee: Alcatel Lucent, Paris (FR)

( * ) Notice: Subject to any disclaimer, the term of this patent is extended or adjusted under 35 U.S.C. 154(b) by 428 days.

(21) Appl. No.: 12/438,101

(22) PCT Filed: Aug. 21, 2007

(86) PCT No.: PCT/CN2007/002527
§ 371 (c)(1),
(2), (4) Date: Jun. 25, 2010

(87) PCT Pub. No.: WO2008/025243
PCT Pub. Date: Mar. 6, 2008

(65) Prior Publication Data
US 2010/0265866 A1 Oct. 21, 2010

(30) Foreign Application Priority Data

Aug. 22, 2006 (CN) ...................... 2006 1 0109905 A (51) Int. Cl.
*H04H 20/71* (2008.01)
*H04H 20/72* (2008.01)
(52) U.S. Cl. .................. 370/312; 370/328; 370/338
(58) Field of Classification Search .................. 370/312, 370/328, 338
See application file for complete search history.

(56) References Cited

U.S. PATENT DOCUMENTS

2004/0190469 A1* 9/2004 Pekonen et al. .............. 370/328
(Continued)

FOREIGN PATENT DOCUMENTS

CN 1645798 A 7/2005
(Continued)

OTHER PUBLICATIONS

3GPP "Universal Mobile Telecommunications System (UMTS) Introduction of the Multimedia Broadcast/Multicast Service (MBMS) in the Radio Access Networ (RAN); Stage 2" 3GPP TS 25.346 Version 6.8.0, Release 6, Jun. 2006.*

(Continued)

*Primary Examiner* — Robert Wilson
*Assistant Examiner* — Robert M Morlan
(74) *Attorney, Agent, or Firm* — Fay Sharpe LLP (57) ABSTRACT

The present invention provides an Evolved Multimedia Broadcast/Multicast Service (EMBMS) access gateway supporting network multicast, comprising: receiving/responding means for receiving a Multimedia Broadcast/Multicast Service (MBMS) Session Start message from a Broadcast/Multicast-Service Center (BM-SC) and for returning a response message to the BM-SC after receiving the MBMS Session Start message; storage means for storing a mapping relationship between respective MBMS service areas (SAs) and respective base stations; determining means for determining base station(s) associated with the MBMS based on the stored mapping relationship when the receiving/responding means receives the MBMS Session Start message; and transmitting means for transmitting the MBMS Session Start message to the determined bases station(s).

31 Claims, 9 Drawing Sheets

U.S. PATENT DOCUMENTS

| | | | |
|---|---|---|---|
| 2005/0074024 A1* | 4/2005 | Kim et al. | 370/432 |
| 2005/0111393 A1 | 5/2005 | Jeong et al. | |
| 2007/0197235 A1 | 8/2007 | Zhang | |
| 2007/0213081 A1* | 9/2007 | Zhang | 455/466 |
| 2007/0265012 A1* | 11/2007 | Sorbara et al. | 455/446 |
| 2007/0275742 A1 | 11/2007 | Zhang | |

FOREIGN PATENT DOCUMENTS

| | | |
|---|---|---|
| CN | 1630412 B | 5/2010 |
| EP | 1742413 A1 | 4/2007 |
| WO | 2005101737 A1 | 10/2005 |

OTHER PUBLICATIONS

Nokia, "MBMS Aspects in SAE/LTE Work," R3-060652, 3GPP TSG RAN WG3#, May 8-12, 2006.

International Search Report.

Nortel Networks, LTE Broadcast, 3GPP TSG RAN WG2 ad-hoc on LTE, Jun. 27-30, 2006, Cannes France, Tdoc R2-061913, 4 pages.

European Patent Application No. 07800747, European Search Report, Jun. 20, 2012, 12 pages.

ETSI TS 123 246, Universal Mobile Telecommunications System, Multimedia Broadcast/Multicast Services, Architecture and Functional Description, V6.10.10, Jun. 2006, 49 pages.

English Bibliography for PCT Patent Application Publication No. WO 2005/101737, published Oct. 27, 2005, printed from Thompson Innovations on Jul. 5, 2012, 5 pages.

Nokia, "MBMS aspects in SAE/LTE work"; R3-060652; 3GPP TSG RAN WG3 #; May 8-12, 2006; 4 pages.

Vodafone Group "Support of MBMS in E-UTRAN"; R3-060694; 3GPP TSG RAN WG3 #52; May 8-12, 2006; 8 pages.

PCT App. No. PCT/CN2007/002527; Written Opinion of the International Searching Authority; Nov. 29, 2007; 5 pages.

English Bibliography for Chinese Patent Application Publication No. 1630412, published May 5, 2010; Printed from Thomson Innovation on May 15, 2012 (3 pages).

English Bibliography for Chinese Patent Application Publication No. 1645798, published Jul. 27, 2005, Printed from Thomson Innovation on May 15, 2012 (3 pages).

* cited by examiner

S400 START

S402 RECEIVING PACKETS VIA A GI INTERFACE, AND CONVERTING THEM BACK TO IP MULTICAST PACKETS

S404 PARSING AN IP MULTICAST ADDRESS IP A FROM THE IP MULTICAST PACKETS

S408 PACKAGING THE IP MULTICAST PACKETS INTO PDCP PACKETS

S410 PACKAGING THE PDCP PACKETS INTO IP MULTICAST PACKETS WITH IP A AS THE IP MULTICAST ADDRESS

S412 TRANSMITTING THE IP MULTICAST PACKETS TO ENB(S) OVER PHYSICAL CONNECTIONS BY MEANS OF OTHER PROTOCOLS OF THE TNL

S420 END

EVOLVED MULTIMEDIA BROADCAST/MULTICAST SERVICE ACCESS GATEWAY, BASE STATION AND METHODS THEREOF

BACKGROUND OF THE INVENTION

1. Field of Invention

The present invention relates to the mobile communication field, especially, System Architecture Evolution/Long Term Evolution (SAE/LTE) in the 3G mobile communication field, and more particularly, to an Evolved Multimedia Broadcast/Multicast Service (EMBMS) access gateway, a base station, and methods thereof, which support Internet Protocol (IP) multicast.

2. Description of Prior Art

Current network architectures based on SAE/LTE are flatter than those before evolution. On one hand, a two-node architecture (base station NodeB+Radio Network Controller RNC) of radio access network portions is simplified into an one-node architecture (base station eNodeB, "eNB" for short hereinafter). On the other hand, mesh like connections are introduced. That is to say, one eNB may be connected to multiple access gateways (aGWs) via an S1 interface, and one eNB may be connected to multiple neighboring eNBs via an X2 interface. Such connections may be physical or logical. Two eNBs, if logically connected, may be physically connected via an aGW. The architecture of SAE/LTE is shown in FIG. 1.

Figure 1:
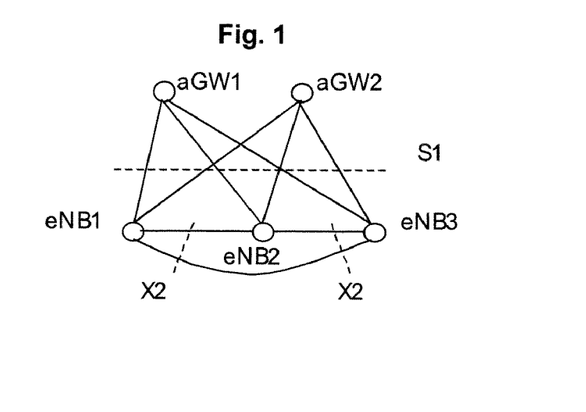
FIG. 1 is a schematic view showing a network architecture of SAE/LTE.

Specifically, referring to FIG. 1, two access gateways aGW1 and aGW2 are connected to three base stations eNB1, eNB2 and eNB3 via S1 interfaces respectively, and the three base stations eNB1, eNB2 and eNB3 are connected to each other via X2 interfaces. FIG. 1 shows a situation where there are physical connections between the respective nodes. If there is no X2 interface connection between eNB1 and eNB3, than eNB1 may be connected to eNB3 via aGW1 or aGW2, so that there is a logical connection between eNB1 and eNB3.

Specifications for SAE/LTE have been defined from the time of 3GPP Re17. In the architecture of SAE/LTE, MBMS is termed as EMBMS (Evolved-MBMS). Such flat architecture brings a new challenge to efficient transmission Multimedia Broadcast/Multicast Service (MBMS) data: whether to continue to use the GTP protocol (GPRS tunneling protocol) before the Re17 version in connecting eNBs and aGWs, or to introduce other techniques. In current discussions on 3GPP, it is proposed to introduce IP multicast into the architecture of broadcast/multicast service. However, in current specifications, how to connect an eNB and an aGW on a user plane has not been defined. That is to say, 3GPP has not defined protocol architecture on the S1 interface. In the present invention, protocol architecture on the S1 interface is provided and further how to transmit MBMS control information is discussed, and thereby an EMBMS access gateway, a base station and methods thereof, which support IP multicast, are provided.

Documents proposed by Nokia and Vodafone in the 52$^{nd}$ Conference of RAN3 in May, 2006 (R3-060652 MBMS aspects in SAE/LTE work, Nokia; R3-060694 Support of MBMS in E-UTRAN) show that they approve of introducing IP multicast into EMBMS, with some simple analyses on how to transmit EMBMS control information on the S1 interface. For multicast services, Nokia proposes to transmit an MBMS Session Start message to eNBs included in a Service Area ("SA" for short hereinafter) and also included in a Tracking Area ("TA" hereinafter) hosting interested users. Vodafone proposes to transmit an MBMS Session Start message to eNBs included in a TA hosting interested users. Further, for broadcast services, both Nokia and Vodafone hold that an MBMS Session Start message should be transmitted to eNBs included in an SA.

However, the above two documents just proposed that IP multicast may be introduced into EMBMS, without any discussions on the protocol stack architecture and operations. Therefore, it is still unknown how to let IP multicast play a role in transmission of service data.

Therefore, there is a need for an EMBMS access gateway, a base station and methods thereof, which support IP multicast, and from which it can be known how to transmit EMBMS service data by means of IP multicast under the framework of SAE/LTE so that MBMS service data from an aGW arrive at an eNB more efficiently.

The above two documents, though giving a flow design scheme for EMBMS, have some problems in the technical aspects. For example, for multicast services, when an aGW select eNBs to which an MBMS Session Start message is transmitted, there may be a problem that some eNBs which indeed need receipt of the MBMS Session Start message actually do not receive such MBMS Session Start message.

Therefore, there is a need for an EMBMS access gateway, a base station and methods thereof supporting IP multicast, which on one hand enable an eNB to get sufficient information from an aGW, and on the other hand facilitate function implementation and flow design of the eNB in various possible situations.

SUMMARY OF THE INVENTION

It is an object of the present invention to provide an EMBMS access gateway supporting IP multicast, from which sufficient information can be obtained so that MBMS service data from the access gateway can arrive at eNBs more efficiently. The present invention also provides a corresponding base station and methods of operating the EMBMS access gateway and the base station for IP multicast.

According to an aspect of the invention, there is provided an Evolved Multimedia Broadcast/Multicast Service (EMBMS) access gateway supporting network multicast, comprising: receiving/responding means for receiving a Multimedia Broadcast/Multicast Service (MBMS) Session Start message from a Broadcast/Multicast-Service Center (BM-SC) and for returning a response message to the BM-SC after receiving the MBMS Session Start message; storage means for storing a mapping relationship between respective MBMS service areas (SAs) and respective base stations; determining means for determining base station(s) associated with the MBMS based on the stored mapping relationship when the receiving/responding means receives the MBMS Session Start message; and transmitting means for transmitting the MBMS Session Start message to the determined bases station(s).

According to another aspect of the invention, there is provided a method of operating an Evolved Multimedia Broadcast/Multicast Service (EMBMS) access gateway supporting network multicast, comprising steps of: receiving a Multimedia Broadcast/Multicast Service (MBMS) Session Start message with respect to a multimedia broadcast/multicast service from a Broadcast/Multicast-Service Center (BM-SC); returning a response message to the BM-SC after receiving the MBMS Session Start message; determining base station(s) associated with the multimedia broadcast/multicast service based on a stored mapping relationship between respective MBMS service areas (SAs) and respective base stations; and transmitting the MBMS Session Start message to the determined bases station(s).

According to still another aspect of the invention, there is provided an Evolved Multimedia Broadcast/Multicast Service (EMBMS) access gateway supporting network multicast, comprising: storage means for storing a routing table; receiving means for receiving data from a Broadcast/Multicast-Service Center (BM-SC) and for converting the received data back to Internet Protocol (IP) multicast packets; Packet Data Convergence Protocol (PDCP) packet processing means for packaging the IP multicast packets into PDCP packets; IP multicast packet processing means for extracting an IP multicast address from the converted IP multicast packets, re-packaging the packaged PDCP packets into IP multicast packets with the extracted IP multicast address as the IP multicast address, and determining base station(s) to receive the re-packaged IP multicast packets based on the extracted IP multicast address and the stored routing table; one or more transport protocol processing means, associated with respective base stations respectively, for processing the re-packaged IP multicast packets based on corresponding transport protocol(s); and one or more transmitting means, associated with respective base stations respectively, for transmitting the packets which have been processed based on the corresponding transport protocol(s) to the determined base station(s).

According to still another aspect of the invention, there is provided a method of operating an Evolved Multimedia Broadcast/Multicast Service (EMBMS) access gateway supporting network multicast, comprising steps of: receiving data from a Broadcast/Multicast-Service Center (BM-SC), and converting the received data back to Internet Protocol (IP) multicast packets; extracting an IP multicast address from the converted IP multicast packets; packaging the received IP multicast packets into Packet Data Convergence Protocol (PDCP) packets; re-packaging the PDCP packets into IP multicast packets with the extracted IP multicast address as the IP multicast address; determining base station(s) to receive the re-packaged IP multicast packets based on the extracted IP multicast address and a stored routing table; processing the re-packaged IP multicast packets based on corresponding transport protocol(s); and transmitting the packets which have been processed based on the corresponding transport protocol(s) to the determined base station(s).

According to still another aspect of the invention, there is provided an Evolved Multimedia Broadcast/Multicast Service (EMBMS) base station supporting network multicast, comprising: receiving/responding means for receiving a Multimedia Broadcast/Multicast Service (MBMS) Session Start message and an MBMS Session Update message from an access gateway (aGW), and for returning a response message to the aGW; storage means for storing a mapping relationship between respective MBMS service areas (SAs) and respective cells managed by the base station; notification procedure processing means for initiating a notification procedure in a desired cell and returning a result of the notification procedure; transmitting means for transmitting various information and data to the respective cells; and base station controller for controlling operations of the base station, and determining whether to initiate a notification procedure or not in each of the managed cells based on the received MBMS Session Start message or MBMS Session Update message and the stored mapping relationship.

According to still another aspect of the invention, there is provided a method of operating an Evolved Multimedia Broadcast/Multicast Service (EMBMS) base station supporting network multicast, comprising steps of: receiving a Multimedia Broadcast/Multicast Service (MBMS) Session Start message and an MBMS Session Update message from an access gateway (aGW), and returning a response message to the aGW; with respect to each of cells managed by the base station, carrying out the following operations based on the received MBMS Session Start message and MBMS Session Update message and a stored mapping relationship: determining whether it is necessary to initiate a notification procedure in this cell, and initiating the notification procedure if it is necessary and waiting for a result of the notification procedure; determining whether it is necessary to allocate a radio bearer (RB) to this cell; allocating the RB to this cell if it is necessary, and informing a user equipment (UE) of the RB configuration information; and determining whether it is necessary to transmit state information of the multimedia broadcast/multicast service if it is not necessary to allocate an RB to this cell, and transmitting the state information if it is necessary.

According to still another aspect of the invention, there is provided an Evolved Multimedia Broadcast/Multicast Service (EMBMS) base station supporting network multicast, comprising: receiving means for receiving Multimedia Broadcast/Multicast Service (MBMS) data from an access gateway (aGW); storage means for storing a mapping relationship between respective MBMS service areas (SAs) and respective cells managed by the base station; Internet Protocol (IP) multicast packet processing means for receiving IP multicast packets, extracting contents of the IP multicast packets, and determining cell(s) to receive the contents of the IP multicast packets based on the stored mapping relationship; radio interface protocol processing means, associated with the respective cells managed by the base station, for carrying out radio interface protocol processing on the data from the IP multicast packet processing means, and supplying the processed data to transmitting means; the transmitting means for transmitting various information and data to the respective cells; and a base station controller for controlling the storage means and the IP multicast packet processing means, and supplying the IP multicast packets received by the receiving means to the IP multicast packet processing means.

According to still another aspect of the invention, there is provided a method of operating an Evolved Multimedia Broadcast/Multicast Service (EMBMS) base station supporting network multicast, comprising steps of: receiving Multimedia Broadcast/Multicast Service (MBMS) service data from an access gateway (aGW); receiving Internet Protocol (IP) multicast packets, and extracting contents of the IP multicast packets; determining cell(s) to receive the contents of the IP multicast packets based on a stored mapping relationship between respective MBMS service areas (SAs) and respective cells managed by the base station; carrying out radio interface protocol processing on the contents of the IP multicast packets; and transmitting the processed data to the determined cell(s).

BRIEF DESCRIPTION OF THE DRAWINGS

Preferred embodiments of the present invention will be described in detail hereinafter with reference to attached drawings, wherein.

DETAILED DESCRIPTION OF PREFERRED EMBODIMENTS

Hereinafter, embodiments of the present invention are explained with reference to the drawings. It is to be noted that the embodiments are just provided for the purpose of illumination, rather than limitation on the invention. Various numeral values provided here are not intended to limit the present invention, and may be modified by those skilled in the art as desired.

Figure 2:
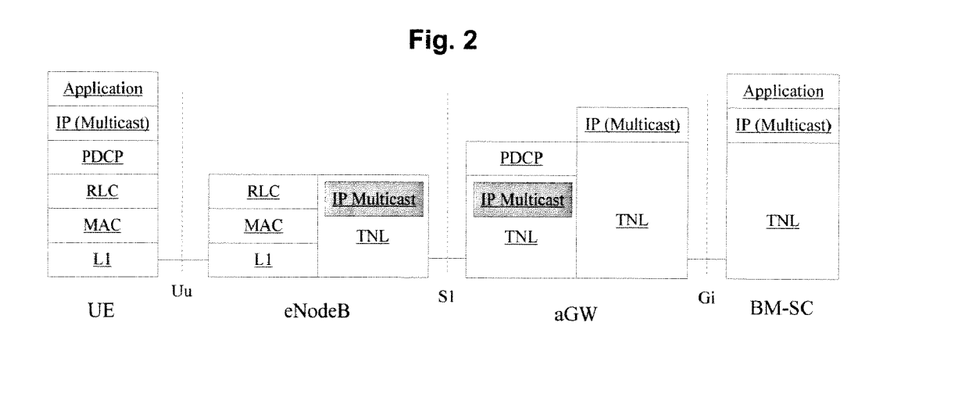
FIG. 2 is a schematic view showing protocol stack architectures of network nodes wherein IP multicast has been introduced.

FIG. 2 is a schematic view showing protocol stack architectures of network nodes wherein IP multicast has been introduced.

On a user plane, since IP multicast is to be introduced into a base station (eNB). IP multicast may serve as a bearer protocol of user plane data for an S1 interface. Thus, protocol stacks of respective nodes are shown as FIG. 2. A Broadcast/Multicast-Service Center (BM-SC) has same functions as BM-SC in 3GPP Re 16. An access gateway (aGW) is connected to the BM-SC via a Gi interface.

The whole transfer of MBMS services involves two layers of IP multicast packaging. The first layer relates to the application layer, and is identified at the side of BM-SC, aGW and UE. The second layer relates to the transport layer at the S1 interface, with a protocol architecture shown by hatching portions in FIG. 2. Under the IP multicast protocol layer, there are other transport layer protocols, which are totally indicated as Transport Network Layer (TNL) in FIG. 2. In the present invention, there is no specific limitation on the protocol stacks of these transport layer protocols, and the transport network layer protocol stacks in the existing specifications may be followed.

After receiving IP multicast packets, a standard IP multicast router forwards the received IP multicast packets to an IP multicast address, without performing additional process. However, when IP multicast is introduced into EMBMS, since PDCP (Packet Data Convergence Protocol) is implemented in the first layer of the aGW, it is necessary to carry out re-packaging, on basis of PDCP packets, for IP multicast at the second layer of the aGW. Therefore, in a transmission path of IP multicast, the aGW is no more a standard IP multicast router, and it must parse the IP multicast address from the received IP multicast packets and then carry out packaging for IP multicast at the second layer with use of the IP multicast address. After that, the IP multicast packets are distributed to all eNBs which need the IP multicast packets by means of routing. For different services, the aGW may need to distribute the data to different eNBs. This is guaranteed by the IP multicast group management protocol and a routing table, which have no relation to the present invention, and detailed descriptions of which are omitted.

Figure 3A:
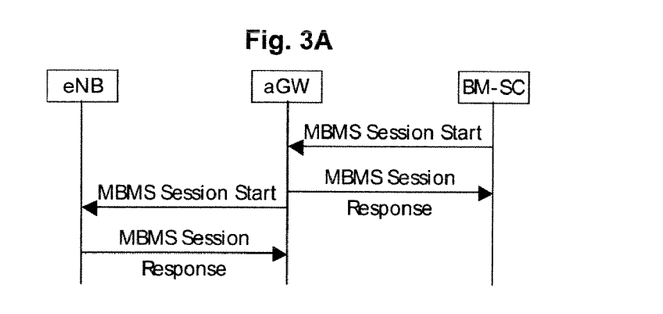
FIG. 3A is a time sequence chart showing a procedure of MBMS service initiation.

FIG. 3A is a time sequence chart showing a procedure of MBMS service initiation.

As shown in FIG. 3A, on the control plane, the initiation of MBMS service is informed to a downstream node by an upstream node by means of MBMS Session Start.

After receiving the MBMS Session Start message from the BM-SC, the aGW returns an MBMS Session Start Response message as a replay to the BM-SC. Then, the aGW judges which eNB(s) connected thereto to obtain the MBMS Session Start message. Here. EMBMS follows the principle of MBMS, that is, to provide a service to users within a pre-defined geographic area (which area is termed as Service Area SA). Different services may have different SAs. This is because one same geographic area may be covered by several cells of different levels when operators make the network plans.

In the present invention, if an eNB at least includes a cell belonging to an SA of an MBMS service, then this eNB needs to receive an MBMS Session Start message for this service.

Figure 3B:
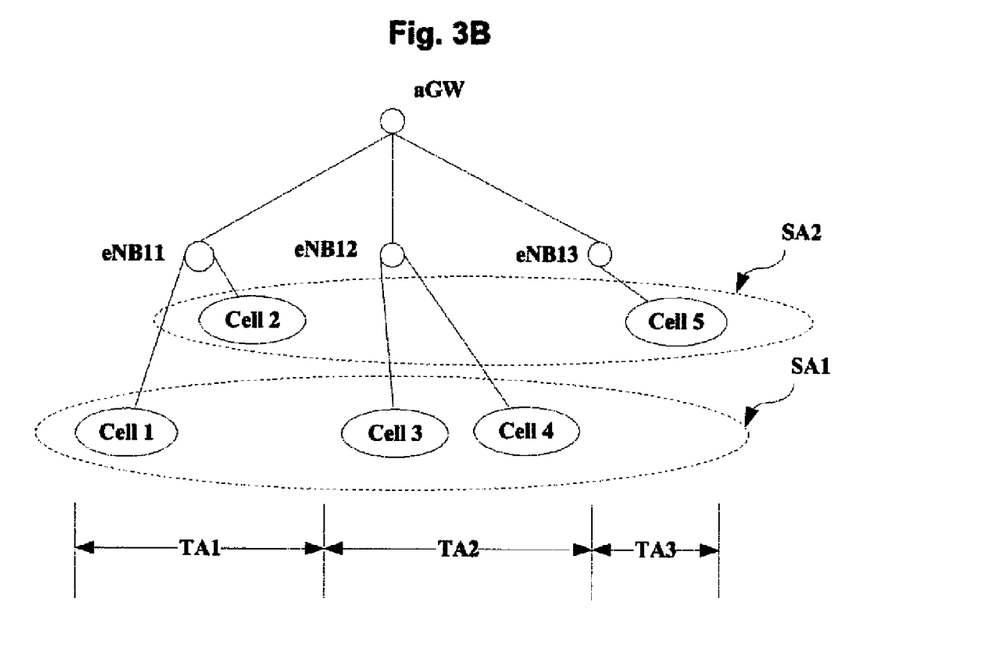
FIG. 3B is a schematic view for explaining to which eNBs an MBMS Session Start message should be transmitted.

For example, FIG. 3B is a schematic view for explaining to which eNBs the MBMS Session Start for MBMS service 1 should be transmitted. For eNB11, though it has only cell 1 belonging to SA1 and cell 2 not belonging to SA1, it must receive the MBMS Session Start message. For eNB12, with cells 3 and 4 both belonging to SA1, it should receive the MBMS Session Start message. However, for eNB13 managing cell 5 which does not belong to SA1, it needs not to receive the MBMS Session Start message.

This also means that the aGW must keep a mapping relationship between SAs and eNBs (referring to Table 1). The aGW may obtain the mapping relationship between SAs and eNBs in various ways. For example, an operator may maintain a mapping table of SAs to cells and a mapping table about cells managed by respective eNBs at an OMC (Operation, Management, Control) device. Then, the mapping relationship between SAs and eNBs may be inferred from these two mapping tables, and is informed to the aGW by means of a static configuration at initialization of the aGW. The OMC device may also, at initiation of a session for an MBMS service, infer the mapping relationship between SAs and eNBs with respect to this MBMS service from these two mapping tables, and than inform the aGW of this relationship. However, in the present invention, the ways in which the aGW obtains the above mapping relationship are not limited.

For example, in the situation as shown in FIG. 3B, the aGW may keep the following mapping relationship (Table 1):

TABLE 1

| Service Area (SA) | Base Station (eNB) |
|---|---|
| SA1 | eNB11, eNB12 |
| SA2 | eNB11, eNB13 |

In the MBMS Session Start message, the aGW should inform the eNB of the SA. Since the eNB keep the mapping relationship between SAs and cells (referring to Table 2), the eNB may transmit state information that the service is initiated or the service is ongoing on air interfaces of the cells managed thereby. For multicast service, such information may trigger a notification procedure, and further trigger a counting or voting procedure on the air interfaces. These procedures may be triggered by the network or by a User Equipment (UE) voluntarily. By these procedures, the eNB is able to judge whether a cell hosts an interested user or not, and further judge whether it is necessary to establish a Radio Bearer (RB) for this service in this cell. In the present invention, the eNB itself determines situations under which the state information that the service is initiated or the service is ongoing should be transmitted, depending on the implementations of the eNB. The eNB may flexibly use such information to achieve the desired functions.

For example, in the situation as shown in FIG. 3B, eNB11-eNB13 may keep the following mapping relationship (Table 2).

TABLE 2

| SA | Cell |
|---|---|
| eNB11 | |
| SA1 | Cell1 |
| SA2 | Cell2 |
| eNB12 | |
| SA1 | Cell3, Cell4 |
| SA2 | — |
| eNB13 | |
| SA1 | — |
| SA2 | Cell5 |

Existing solutions propose to transmit the MBMS Session Start message to eNB(s) included in a TA hosting interested UE(s). However, eNB(s) which is/are included in the service area but do/does not host any interested UE should receive the MBMS Session Start message too.

Figure 3C:
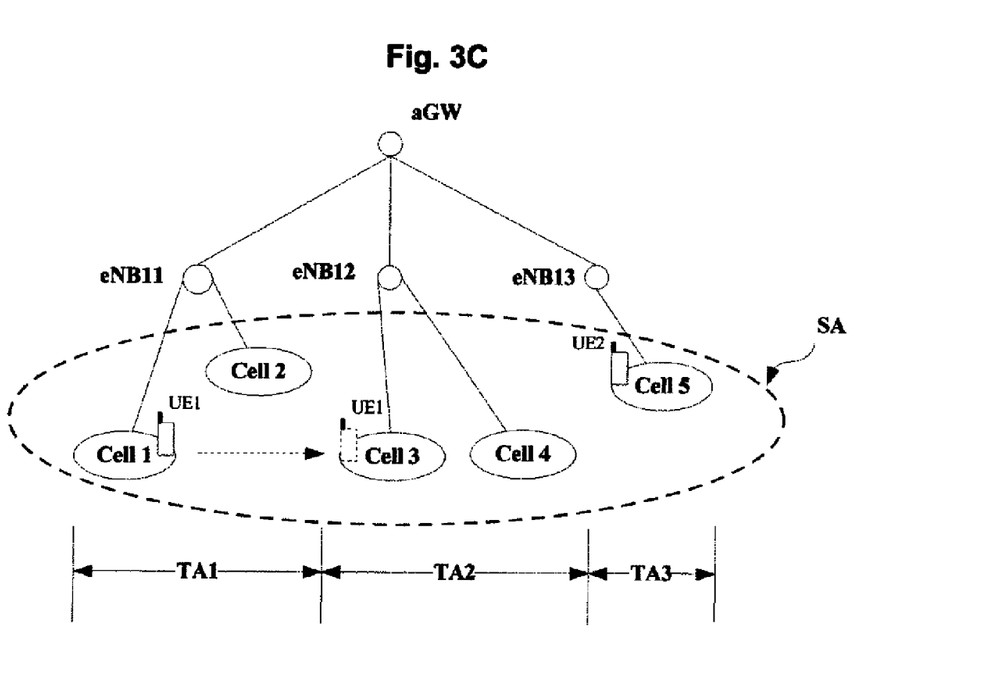
FIG. 3C is a schematic view for explaining to which eNBs an MBMS Session Start message should be transmitted.

Specifically, referring to FIG. 3C, UE 1 in idle state and UE 2 in connection state, which both are interested in an MBMS multicast service, reside in cell 1 and cell 5 respectively. There is no UE interested in this service in cell 3 and cell 4 included in TA 2. Cell 1 is in neighbor to cell 2 and cell 3. This MBMS multicast service transmits service data by a dedicated carrier. Among 5 cells shown in FIG. 3C, cell 2 has no dedicated carrier configured thereto. According to the prior art, though eNB11, eNB12 and eNB13 are all within the SA, only eNB11 and eNB13 can receive the MBMS Session Start message. Therefore, eNB12 cannot transmit any MBMS information on the air interfaces of cell 3 and cell 4. When UE 1 moves away from cell 1, since there is no information on the dedicated carriers of cell 3 and cell 4, it is likely that UE 1 will select cell 2, which has no dedicated carrier configured thereto, in cell reselecting. However, to ensure the continuity of service receiving, it is desired that UE 1 will select cell 3 in cell reselecting. Therefore, according to the present invention, eNB12 should receive the MBMS Session Start message in practical operations, so that there is an ability to transmit the MBMS information for use by the UEs on the air interfaces of all cells within the SA. Here, only an exemplary example is provided, the networks are not limited. For example, ways in which the eNBs use the MBMS information to achieve corresponding functions are not limited.

Because the eNBs do not keep the information on the UEs in idle state, following the mechanism of 3GPP Re 16, the aGW must transmit a list of TA(s) hosting UE(s) in idle state, which has/have subscribed an MBMS service, to the eNBs by means of the MBMS Session Start message. Based on this information, the eNBs may further narrow down the group of cells in which the notification procedure should be triggered.

3GPP has defined the possibility of transmitting an EMBMS service by means of a dedicated carrier. The dedicated carrier may be exclusively used by the MBMS service, or may be shared with a unicast service. If the operator has configured a dedicated carrier for EMBMS in the network, then the users should know this information on the air interfaces, so as to be capable of selecting a proper cell to receive the service. Thus, the aGW should include the information on the dedicated carrier in the MBMS Session Start message.

Therefore, the MBMS Session Start message may contain following information:
1) Service ID;
2) Service type (broadcast or multicast);
3) Service Area;
4) a list of TA(s) hosting UE(s) in idle state, which has/have subscribed a service; and
5) Dedicated carrier ID (optional, included if an MBMS service is configured to transmit service data by a dedicated carrier).

After receiving the MBMS Session Start message from the aGW, the eNBs transmit an MBMS Session Start Response message as a reply to the aGW.

When the list of TA(s) hosting UE(s) in idle state, which has/have subscribed a service, is changed, the aGW notify this to the eNBs by means of an MBMS Session Update message. The MBMS Session Update message carries the information on the change of the list. The principle to transmit the MBMS Session Update message may be same as that to transmit the MBMS Session Start message, that is, to transmit it to all eNBs within the SA; or they may be different, and for example, it may be only transmitted to eNBs included in the TA(s) which has/have changed.

After receiving the MBMS Session Update message from the aGW, the eNBs transmit an MBMS Session Update Response message as a replay to the aGW.

Figure 4:
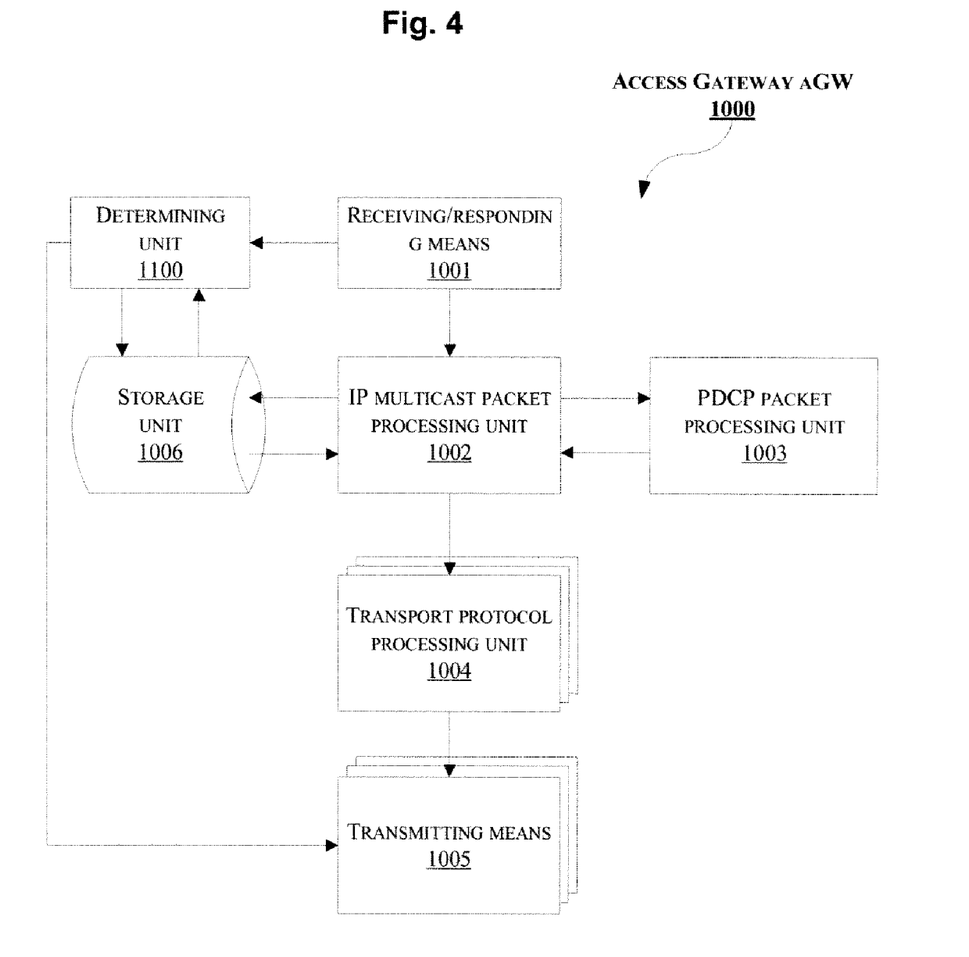
FIG. 4 is a block diagram showing an access gateway according to the present invention.

FIG. 4 is a block diagram showing an access gateway according to the present invention.

The access gateway aGW 1000 comprises receiving/responding means 1001, a determining unit 1100, an IP multicast packet processing unit 1002, a PDCP packet processing unit 1003, a transport protocol processing unit 1004, transmitting means 1005 and a storage unit 1006. Since the aGW 1000 has the function of routing, there are the transport protocol processing unit 1004 and the transmitting means 1005 at each physical port through which it is connected to another device.

The receiving/responding means 1001 is adapted to receive an MBMS Session Start message from the BM-SC, and to return an MBMS Session Start Response message to the BM-SC. Further, the receiving/responding means 1001 is adapted to receive data from the BM-SC via the Gi interface, and to convert the received data back to IP multicast packets, which in turn are transmitted to the IP multicast packet processing unit 1002.

The determining unit 1100 is adapted to determine, when the receiving/responding means 1001 receives an MBMS Session Start message with respect to an MBMS service, eNB(s) associated with the MBMS service based on a mapping relationship between SAs and eNBs stored in the storage unit 1006.

After receiving the IP multicast packets from the receiving means 1001, the IP multicast packet processing unit 1002 parses the IP multicast address, and then transmits the IP multicast packets to the PDCP packet processing unit 1003.

The PDCP packet processing unit 1003 is adapted to package the received data into PDCP packets, which in turn are returned to the IP multicast packet processing unit 1002.

By looking up a routing table stored in the storage unit 1006, the IP multicast packet processing unit 1002 knows to which transport protocol processing unit(s) 1004 the IP multicast packets should be forwarded, which then are transmitted to the eNB(s) which need(s) to receive the MBMS service data by means of the transmitting means 105 via the S1 interface.

Further, the transmitting means 1005 transmits the MBMS Session Start message to the eNB(s) based on the instruction from the determining unit 1100.

Next, the operations of the access gateway according to the present invention will be described in detail with reference to FIG. 5.

Figure 5A:
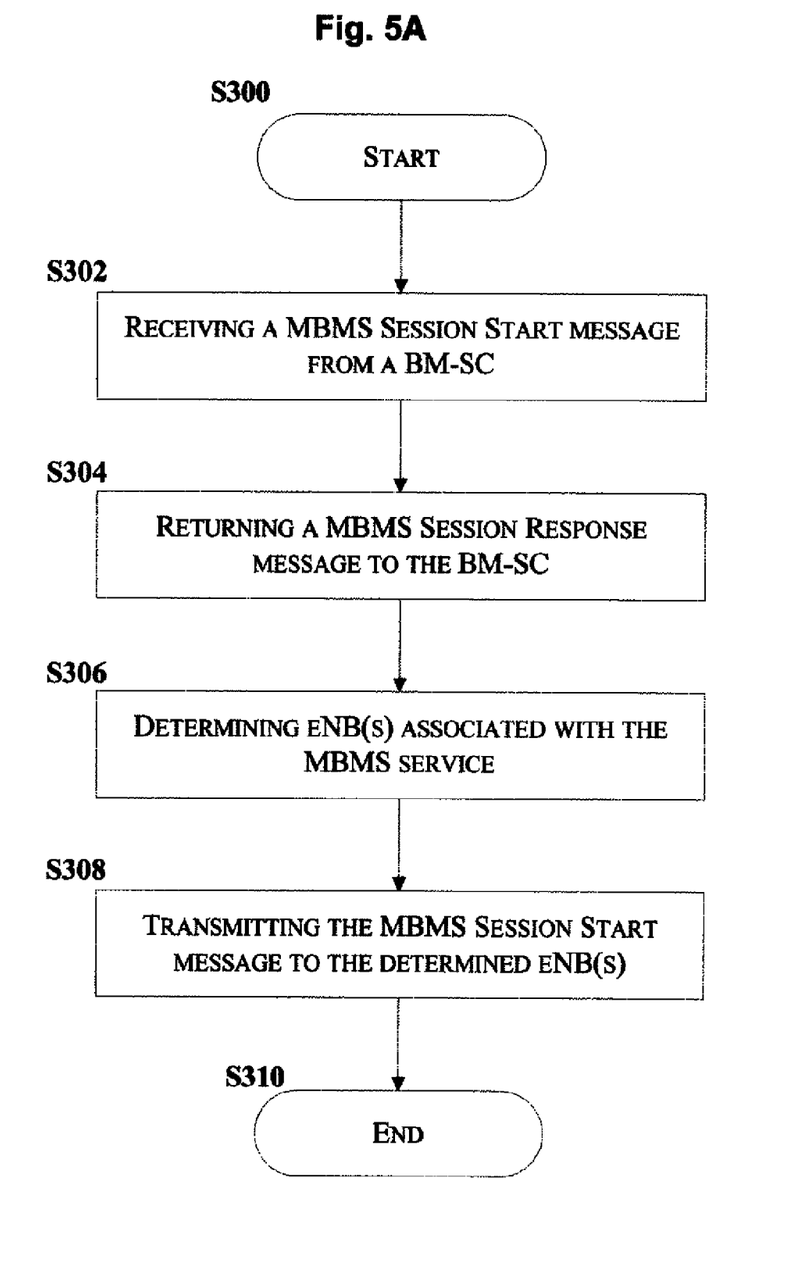
FIG. 5A is a flow chart showing a process of transmitting an MBMS Session Start message by the access gateway.

FIG. 5A is a flow chart showing a process of transmitting an MBMS Session Start message by the access gateway according to the present invention.

First, at step S300, the process of transmitting an MBMS Session Start message by the access gateway according to the present invention is started. As step S302, an MBMS Session Start message with respect to an MBMS service is received from the BM-SC. Then, at step S304, an MBMS session response message is returned to the BM-SC. Next, at step S306, eNB(s) associated with the MBMS service is/are determined based on the stored mapping relationship between respective MBMS SAs and respective eNBs (referring to Table 1). As step S308, the MBMS Session Start message is transmitted to the determined eNB(s). At step S310, the process of transmitting an MBMS Session Start message by the access gateway is ended.

Figure 5B:
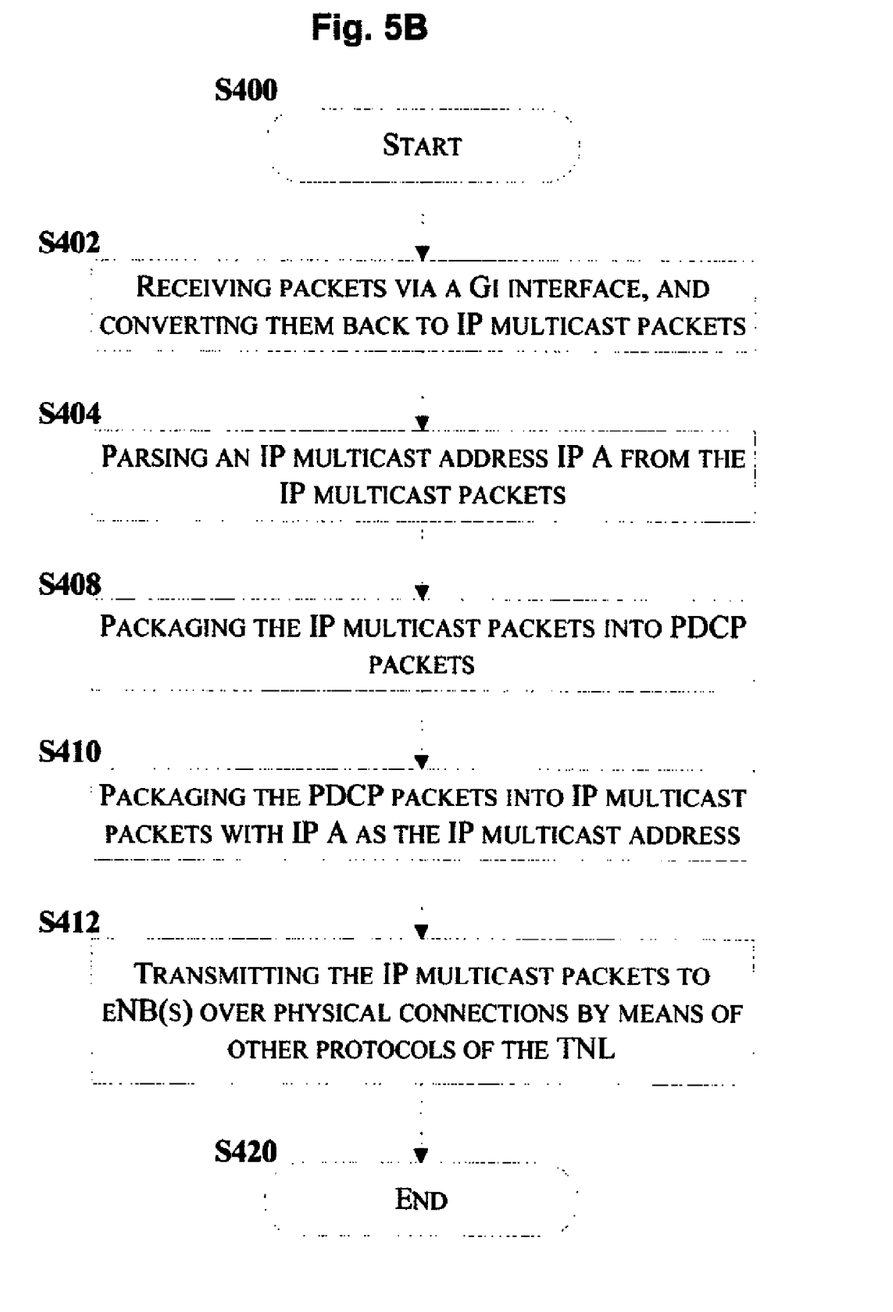
FIG. 5B is a flow chart showing the process on packets by the access gateway.

FIG. 5B is a flow chart showing the process on packets by the access gateway.

First, at step S400, the process on packet by the aGW according to the present invention is started. At step S402, the aGW 1000 receives the service data from the BM-SC via the Gi interface by means of the receiving means 1001, and converts the received data back to IP multicast packets. Then, at step S404, the IP multicast address is parsed by the IP multicast packet processing unit 1002 (here it is assumed that the IP multicast address parsed by the aGW is IP A). Then, at step S408, the PDCP packet processing unit 1003 carries out IP header compression on the IP multicast packets based on the PDCP protocol specifications, so as to ensure the efficiency of transmission on the air interface. At step S410, the IP multicast packet processing unit 1002 carries out IP multicast packaging at the transport layer on the PDCP packets, with an IP header having IP address=IP A. Finally, at step S412, the IP multicast packets are transmitted to the eNB(s) over physical connections via the S1 interface by means of the transport protocol processing unit 1004 and the transmitting means 1005.

After IP multicast is introduced into the S1 interface, the distribution of the MBMS service data on the S1 interface is simplified. Based on the data distribution mechanism of IP multicast, the aGW distributes the packaged IP multicast packets to the IP multicast address. Thus, all the eNBs joining an IP multicast group, which is identified by this address, will receive the IP multicast packets.

Figure 6:
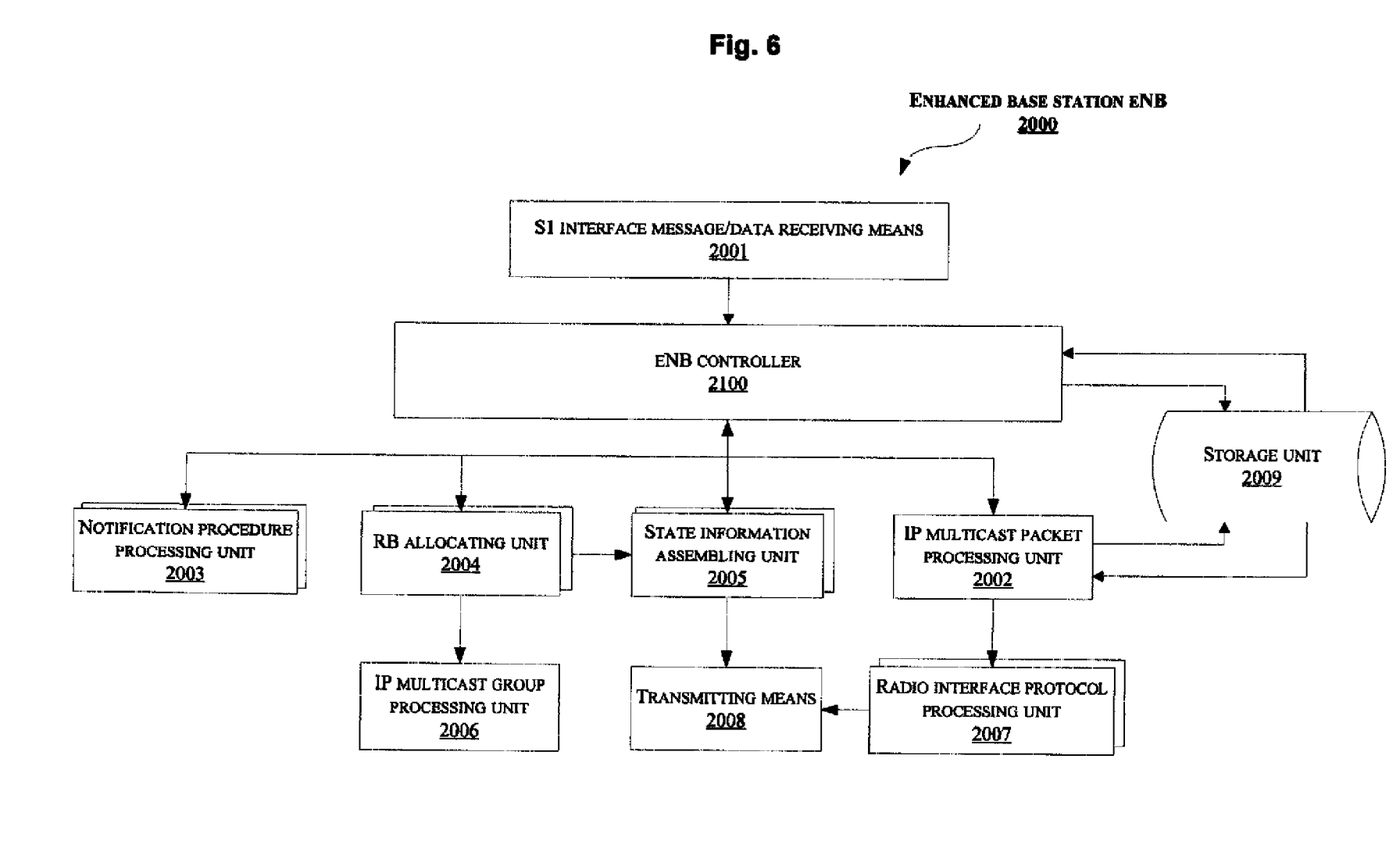
FIG. 6 is a block diagram showing a base station according to the present invention.

FIG. 6 is a block diagram showing a base station according to the present invention.

The eNB 2000 comprises S1 interface message/data receiving means 2001, an eNB controller 2100, an IP multicast packet processing unit 2002, a notification procedure processing unit 2003 (one unit per cell), an RB allocating unit 2004 (one unit per cell), a state information assembling unit 2005 (one module per cell), an IP multicast group processing unit 2006, a radio interface protocol processing unit 2007 (one unit per cell), transmitting means 2008 and a storage unit 2009.

The S1 interface message/data receiving means 2001 is adapted to receive messages and service data from the aGW via the S1 interface, and to transmit the received messages and service data to the eNB controller 2100. After receiving an MBMS Session Start message or an MBMS Session Update message from the aGW, the S1 interface message/data receiving means 2001 returns an MBMS Session Response message to the aGW.

The eNB controller 2100 judges whether it is necessary to trigger corresponding processes of the notification procedure processing unit 2003, the RB allocating unit 2004 and the state information assembling unit 2005 or not, and transmits the received service data to the IP multicast packet processing unit 2002.

The notification procedure processing unit 2003 is adapted to initiate a notification procedure on the air interface, and to return a result of the notification procedure to the eNB controller 2100.

The RB allocating unit 2004 is adapted to allocate an RB to an MBMS service based on an instruction from the eNB controller 2100, and to inform the RB configuration information to the state information assembling unit 2005. The RB allocating unit 2004 is further adapted to judge whether it is necessary to trigger corresponding processes of the IP multicast group processing unit 2006.

The state information assembling unit 2005 assembles the state information and the RB configuration information, which are to be transmitted on the air interface by the transmitting means 2008, based on an instruction from the eNB controller 2100.

The IP multicast group processing unit 2006 is adapted to trigger a procedure of joining or leaving an IP multicast group initiated by the eNB towards the aGW.

The IP multicast packet processing unit 2002 is adapted to receive the IP multicast packet from the eNB controller 2100. After parsing the IP multicast packet, it transmits the data to the radio interface protocol processing unit 2007.

The radio interface protocol processing unit 2007 is adapted to carry out processing of RLC (Radio Link Control), MAC (Media Access Control) and physical layer protocols on the received data, and then to transmit the service data to the users via the air interface by means of the transmitting means 2008.

By looking up the mapping relationship between SAs and cells stored in the storage unit 2009, the eNB controller 2100 is able to determine cells in which the corresponding processes of the notification procedure processing unit 2003, the RB allocating unit 2004 and the state information assembling unit 2005 should be triggered.

By looking up a list of cells, which need to receive the service data, stored in the storage unit 2009, the IP multicast packet processing unit 2002 is able to determine cell(s) to the radio interface protocol processing unit(s) 2007 of which the IP multicast packets should be transmitted.

Figure 7:
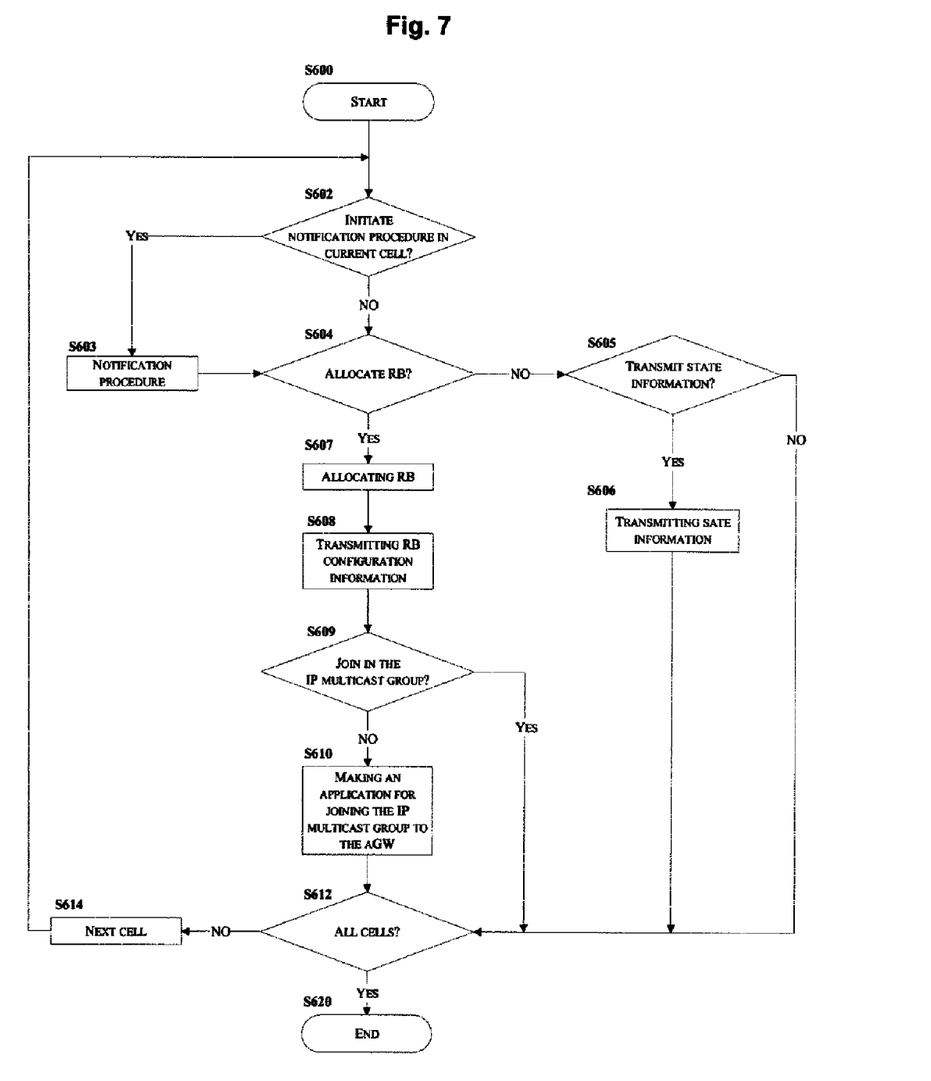
FIG. 7 is a flow chart showing the process of the base station after receiving an MBMS Session Start message.

FIG. 7 is a flow chart showing the process of the base station after receiving an MBMS Session Start message.

First, at step S600, the process of the eNB according to the present invention after receiving an MBMS Session Start message is stated, wherein the S1 interface message/data receiving means 2001 receives an MBMS Session Start message and returns an MBMS Session Response message as a reply to the aGW. At step S602, the eNB controller 2100 judges whether it is necessary to initiate a notification procedure in a current cell, starting from one of the cells managed by the eNB, based on the MBMS Session Start message received by the S1 interface message/data receiving means 2001.

If there is no need to initiate a notification procedure in this cell ("No" in step S602), then at step S604, the eNB controller 2100 judges whether it is necessary to allocate an RB carrying the service data to this cell. If no ("No" in step S604), then at step S605, the eNB controller 2100 judges whether it is necessary to transmit service state information (the service is initiated or is ongoing). If it is necessary to transmit such information ("Yes" in step S605), then at step S606, the eNB controller 2100 informs the state information assembling unit 2005 to instruct it to transmit the state information on the air interface by means of the transmitting means 2008 after assembling the state information. If there is no need to transmit such information ("No" in step S605), then at step S612, the eNB controller 2100 judges whether all the cells managed by the eNB have been processed. If so, then this flow ends; or otherwise, the eNB controller 2100 proceeds to a next cell at step S614, and then returns to step S602.

If it is necessary to initiate a notification procedure in this cell ("Yes" in step S602), then at step S603, the eNB controller informs the notification procedure processing unit 2003 to instruct it to initiate the notification procedure in this cell. After the notification procedure is completed, the notification procedure processing unit 2003 returns the result of the notification procedure to the eNB controller 2100. Based on the result of the notification procedure, the eNB controller 2100 judges whether or not it is necessary to allocate an RB to the current cell at step S604. If it is necessary to allocate the RB ("Yes" in step S604), then at step S607, the eNB controller 2100 instructs the RB allocating unit 2004 to allocate the RB for the current service in this cell. Then, at step S608, the RB allocating unit 2004 informs the state information assembling unit 2005 of the RB configuration information, and also informs the users of the RB configuration information by means of the transmitting means 2008. At the same time, at step S609, the RB allocating unit 2004 triggers judgment by the IP multicast group processing unit 2006, that is, to judge whether the eNB has joined an IP multicast group of the current service or not. If the eNB has joined the group ("Yes" in step S609), then the flow proceeds to step S612. If the eNB has not joined the IP multicast group ("No" in step S609), then at step S610, the IP multicast group processing unit 2006 makes an application for joining the IP multicast group to the aGW, and then the flow proceeds to step S612.

Figure 8:
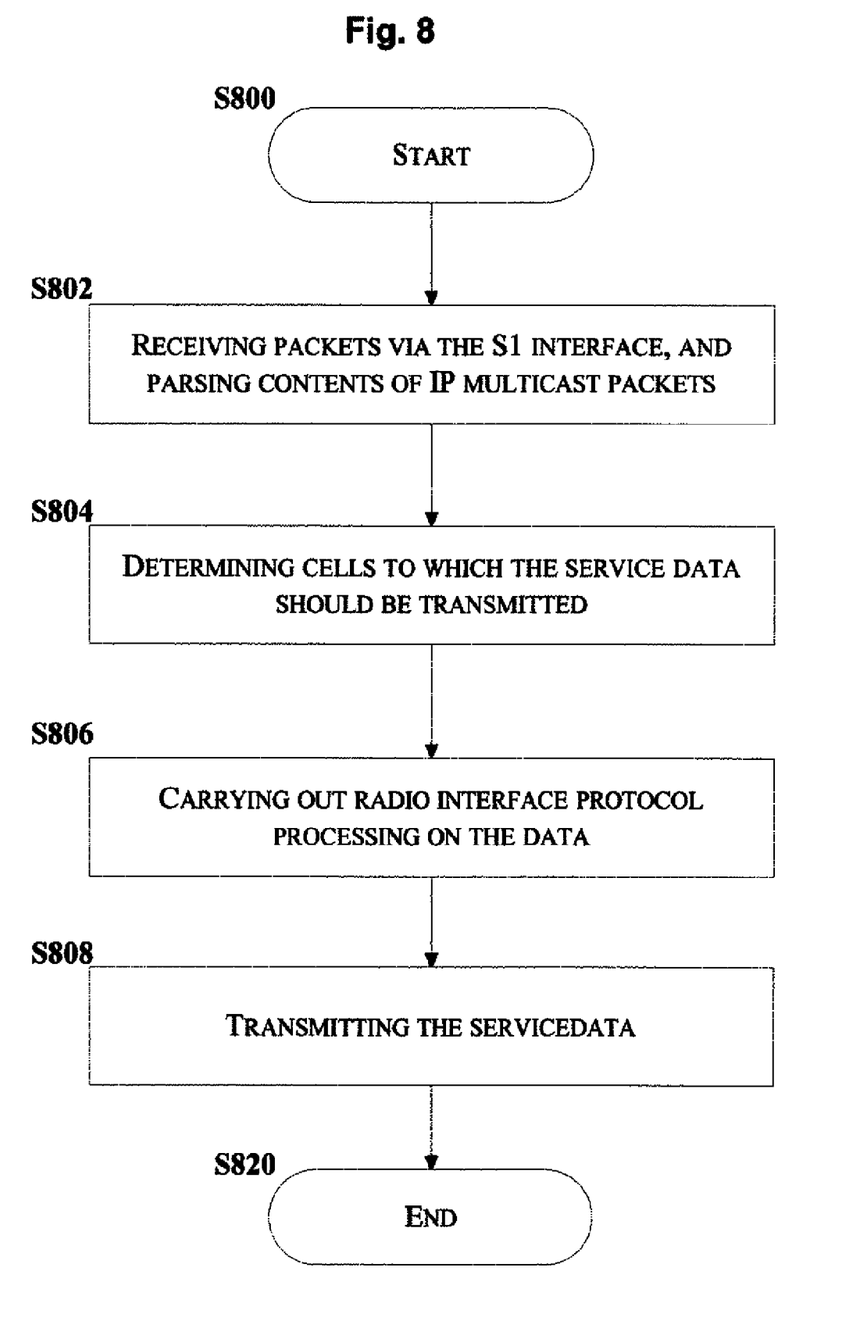
FIG. 8 is a flow chart showing the process of the base station after receiving IP multicast packets.

FIG. 8 is a flow chart showing the process of the base station after receiving IP multicast packets.

First, at step S800, the process of the eNB according to the present invention after receiving IP multicast packets is started. At step S802, the IP multicast packet processing unit 2002 receives the IP multicast packets from the eNB controller 2100, and then parses contents of the IP multicast packets. At step S804, by looking up a list of cells, which need to receive the service data, stored in the storage unit 2009, the IP multicast packet processing unit 2002 determines cell(s) to the radio interface protocol processing unit(s) 2007 of which the IP multicast packets should be transmitted. Then, at step S806, the radio interface protocol processing unit(s) 2007 carries(carry) out processing of RLC, MAC and physical layer protocols on the data received from the IP multicast packet processing unit 2002. At step S808, the processed data are transmitted to the users over the air interfaces by means of the transmitting means 2008.

Figure 9:
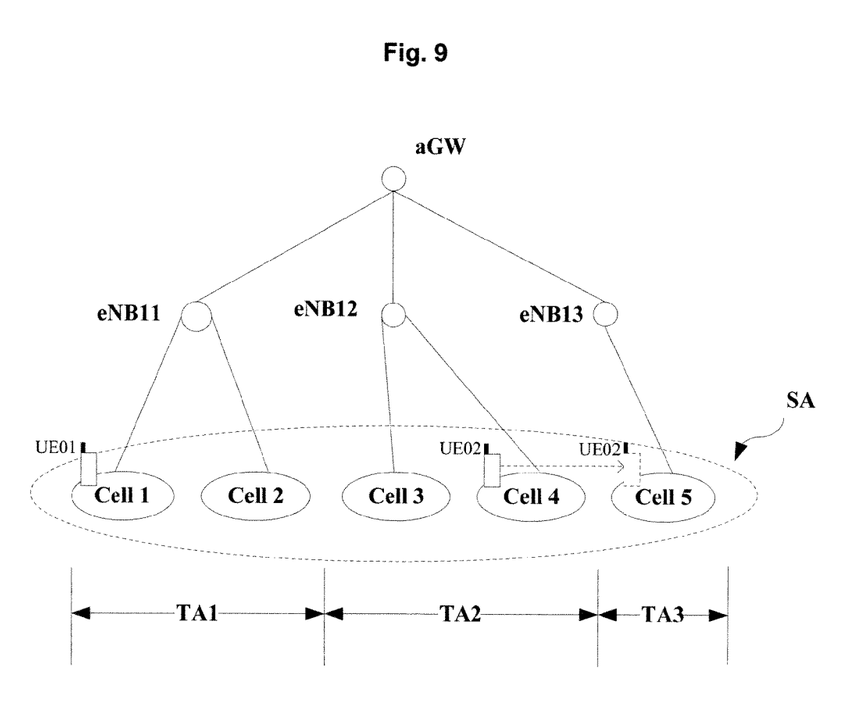
FIG. 9 is a schematic view showing an exemplary scenario of network connections and plans for explaining the present invention in detail.

FIG. 9 is a schematic view showing an exemplary scenario of network connections and plans for explaining the present invention in detail.

Here, descriptions on how an aGW transmits an MBMS Session Start message and how an eNB carries out processing when receiving the MBMS Session Start message are provided. To make a definite analysis, a typical scenario is assumed, as shown in FIG. 9. For simplification, there is provided a scenario where just one aGW is involved in transmission of service data, without losing generality.

Without losing generality, in this scenario it is assumed that:
1) cells 1-5 all belong to SA of an MBMS service A;
2) cells 1 and 2 belong to TA1, cells 3 and 4 belong to TA2, and cell 5 belongs to TA3;
3) only cell 1 hosts a user UE01 which is in connection state and is interested in the MBMS service A, before the aGW transmits an MBMS Session Start message to the eNB; and
4) a user UE02 which is in idle state and is interested in the MBMS service A resides in cell 4, before the aGW transmits an MBMS Session Start message to the eNB.

Based on the above assumption, the aGW transmits the MBMS Session Start message to eNB11, eNB12 and eNB13. The MBMS Session Start message contains information about "a list of TA(s) hosting idle user(s)" which indicates "TA2". If the operator configures a dedicated carrier for this service, then the MBMS Session Start message also contains an ID of the dedicated carrier.

All three of eNB11, eNB12 and eNB13 shown in FIG. 9 transmit information that the service is initiated on the air interfaces, after receiving the MBMS Session Start message. If the MBMS Session Start message carries information on the dedicated carrier, eNB11, eNB12 and eNB13 will transmit the information on the dedicated carrier for use by the MBMS service on the air interfaces.

Specifically, with reference to FIGS. 4-9 in combination, the embodiment of the present invention is described in detail. After receiving the MBMS Session Start message, eNB11, eNB12 and eNB13 may carry out different processes, depending on their respective situations. In the scenario shown in FIG. 9, the processes of eNB11, eNB12 and eNB13 are as follows.

After receiving the MBMS Session Start message, eNB11 detects that cell 1 hosts UE01 which is in connection state and is interested in the MBMS service A, and thus eNB11 determines that there is no need to initiate a notification procedure in cell 1 but it is necessary to allocate an RB to cell 1. However, cells 1 and 2 managed by eNB11 do not belong to TA2 and there is no UE which is in connection state and is interested in the MBMS service A in cell 2, so eNB11 determines there is no need to initiate a notification procedure in cell 2 and also there is no need to allocate an RB, but it is necessary to transmit state information that the transmission of the service is initiated on the air interface. Since eNB11 knows cell 1 hosts UE1, which is in connection state and is interested in the MBMS service A, before receiving the MBMS Session Start message, eNB11 must have already been a member of the IP multicast group. This is ensured by the IP multicast group management protocol, and is omitted in the present application.

After receiving the MBMS Session Start message, eNB12 initiates notification procedures in both cell 3 and cell 4 because it finds cells 3 and 4 managed thereby belong to TA2. The result of the notification procedures shows that only cell 43 hosts interested UE 02. eNB12 only allocates an RB to cell 4, and transmits the state information that the transmission of the service is initiated on the air interface of cell 3. If eNB12 finds it is not a member of the IP multicast group, eNB12 will transmit a request for joining the IP multicast group to the aGW.

After receiving the MBMS Session Start message, eNB13 determines there is no need to initiate a notification procedure in cell 5 and also there is no need to allocate an RB, but the state information that the transmission of the service is initiated may be transmitted on the air interface, because it finds cell 5 managed thereby does not belong to TA2.

The processes of the eNBs after receiving the MBMS Session Update message are similar to those shown in FIG. 7. During the progress of the service, if UE02 in idle state moves from cell 4 to cell 5, the aGW will find the list of TA(s) hosting interested UE(s) which is/are in idle state has changed. The aGW may transmit the changed list to all of eNB11, eNB12 and eNB13 belonging to the service area by means of the MBMS Session Update message. Alternatively, the aGW may transmit the changed list only to eNB13 which is affected by means of the MBMS Session Update message. After receiving the MBMS Session Update message, eNB13 initiates a notification procedure in cell 5. If the result of the notification procedure shows that cell 5 hosts interested UE02, then eNB13 allocates an RB to cell 5. If eNB13 finds it is not a member of the IP multicast group, eNB13 will make a request for joining the IP multicast group to the aGW.

The present invention has provided respective protocol stack architectures for respective network nodes of the EMBMS network architecture after IP multicast is introduced therein, and has defined processes to be carried out when data packets are transmitted from an aGW to an eNB.

As compared with the prior art, the process of MBMS session start is more complete. In the present invention, functional requirements of eNBs are fully taken into account, and sufficient information is carried in messages, resulting in convenience in function implementation and flow design of the eNBs. Further, according to the present invention, it is possible to provide more flexibility in flow design of air interfaces.

It is to be noted that the above embodiments are provided just for illustration rather than limitation on the present invention. Though the present invention is described in detail with reference to the above embodiments, it is to be understood by those skilled in the art that modifications or equivalents may be made thereto. Any modifications or partial substitutions without departing from the spirit and scope of the present invention all fall into the scope defined by the appended claims.

What is claimed is:

1. An Evolved Multimedia Broadcast/Multicast Service (EMBMS) access gateway supporting network multicast, comprising:
    a service center receiver configured to receive a Multimedia Broadcast/Multicast Service (MBMS) Session Start message from a Broadcast/Multicast-Service Center (BM-SC) and return a response message to the BM-SC after receiving the MBMS Session Start message;
    a storage unit configured to store a mapping relationship between respective MBMS service areas (SAs) and respective base stations;
    a determining unit configured to determine base station(s) associated with the MBMS based on the stored mapping relationship after the service center receiver receives the MBMS Session Start message; and
    a transmitter configured to transmit the MBMS Session Start message to the determined bases station(s) associated with the MBMS;
    wherein the determining unit is further configured to determine when a list of tracking area(s) (TA(s)) hosting user equipment(s) (UE(s)) in idle state, that has/have subscribed to the MBMS, is changed, and to determine base station(s) associated with the change, and the transmitter is further configured to transmit an MBMS Session Update message to the determined base station(s) associated with the change.

2. The access gateway according to claim 1, wherein bases station(s) associated with a multimedia broadcast/multicast service comprise(s) a base station having at least one cell belonging to an SA of the multimedia broadcast/multicast service.

3. The access gateway according to claim 1, wherein the MBMS Session Start message transmitted by the transmitter includes a service ID, a service type, an SA, and a list of tracking areas (TAs) hosting user equipment(s) (UE/UEs) which is/are in idle state and has/have subscribed to the MBMS.

4. The access gateway according to claim 3, wherein the MBMS Session Start message transmitted by the transmitter further includes a dedicated carrier ID.

5. The access gateway according to claim 3, wherein the service type comprises broadcast and multicast.

6. The access gateway according claim 1, wherein the base station(s) associated with the change comprise(s) a base station having at least one cell belonging to an SA of the MBMS to which the UE has subscribed.

7. The access gateway according to claim 1, wherein the base station(s) associated with the change comprise(s) a base station having at least one cell belonging to TAs between which the UE moves.

8. The access gateway according to claim 1, wherein the base station(s) associated with the change comprise(s) a base station having at least one cell belonging to a TA from which the UE moves away, or a base station having at least one cell belonging to a TA to which the UE moves.

9. A method of operating an Evolved Multimedia Broadcast/Multicast Service (EMBMS) access gateway supporting network multicast, comprising steps of:
    receiving a Multimedia Broadcast/Multicast Service (MBMS) Session Start message with respect to a multimedia broadcast/multicast service from a Broadcast/Multicast-Service Center (BM-SC);
    returning a response message to the BM-SC after receiving the MBMS Session Start message;
    determining base station(s) associated with the multimedia broadcast/multicast service based on a stored mapping relationship between respective MBMS service areas (SAs) and respective base stations;
    transmitting the MBMS Session Start message to the determined bases station(s) associated with the MBMS;
    determining when a list of tracking area(s) (TA(s)) hosting user equipment(s) (UE(s)) in idle state, that has/have subscribed to the MBMS, is changed, and base station(s) associated with the change; and
    transmitting an MBMS Session Update message to the determined base station(s) associated with the change.

10. The method according to claim 9, wherein bases station(s) associated with a multimedia broadcast/multicast service comprise(s) a base station having at least one cell belonging to an SA of the multimedia broadcast/multicast service.

11. The method according to claim 9 or wherein the MBMS Session Start message transmitted by the access gateway includes a service ID, a service type, an SA, and a list of tracking areas (TAs) hosting user equipment(s) (UE/UEs) which is/are in idle state and has/have subscribed to the MBMS.

12. The method according to claim 11, wherein the MBMS Session Start message transmitted by the access gateway further includes a dedicated carrier ID.

13. The method according to claim 11, wherein the service type comprises broadcast and multicast.

14. The method according claim 9, wherein the base station(s) associated with the change comprise(s) a base station having at least one cell belonging to an SA of the MBMS to which the UE has subscribed.

15. The method according to claim 9, wherein the base station(s) associated with the change comprise(s) base station(s) belonging to at least one cell within TAs between which the UE moves.

16. The method according to claim 9, wherein the base station(s) associated with the change comprise(s) a base station having at least one cell belonging to a TA from which the UE moves away, or a base station having at least one cell belonging to a TA to which the UE moves.

17. An Evolved Multimedia Broadcast/Multicast Service (EMBMS) access gateway supporting network multicast, comprising:
a storage unit configured to store a routing table;
a service center receiver configured to receive data from a Broadcast/Multicast-Service Center (BM-SC) and convert the received data to Internet Protocol (IP) multicast packets;
a Packet Data Convergence Protocol (PDCP) packet processing unit configured to process the IP multicast packets into PDCP packets;
an IP multicast packet processing unit configured to extract an IP multicast address from the converted IP multicast packets, re-package the packaged PDCP packets into IP multicast packets with the extracted IP multicast address as the IP multicast address, and determine base station(s) to receive the re-packaged IP the corresponding transport protocol(s) to the determined base station(s).

18. A method of operating an Evolved Multimedia Broadcast/Multicast Service (EMBMS) access gateway supporting network multicast, comprising steps of:
receiving data from a Broadcast/Multicast-Service Center (BM-SC), and converting the received data Internet Protocol (IP) multicast packets;
extracting an IP multicast address from the converted IP multicast packets;
packaging the received IP multicast packets into Packet Data Convergence Protocol (PDCP) packets;
re-packaging the PDCP packets into IP multicast packets with the extracted IP multicast address as the IP multicast address;
determining base station(s) to receive the re-packaged IP multicast packets based on the extracted IP multicast address and a stored routing table;
processing the re-packaged IP multicast packets based on corresponding transport protocol(s); and
transmitting the packets which have been processed based on the corresponding transport protocol(s) to the determined base station(s).

19. An Evolved Multimedia Broadcast/Multicast Service (EMBMS) base station supporting network multicast, comprising:
an access gateway receiver configured to receive a Multimedia Broadcast/Multicast Service (MBMS) Session Start message and an MBMS Session Update message from an access gateway (aGW) and return a response message to the aGW;
a storage unit configured to store a mapping relationship between respective MBMS service areas (SAs) and respective cells managed by the base station;
a notification procedure processing unit configured to initiate a notification procedure in a desired cell and return a result of the notification procedure;
a transmitter configured to transmit various information and data to the respective cells; and
a base station controller configured to control operations of the base station and determine whether to initiate a notification procedure or not in each of the managed cells based on the received MBMS Session Start message or MBMS Session Update message and the stored mapping relationship.

20. The base station according to claim 19, further comprising:
a state information assembly unit; and
a radio bearer allocating unit configured to allocate a radio bearer (RB) and inform the state information assembling unit of RB configuration information;
wherein the state information assembling unit is configured to assemble state information and the RB configuration information to be transmitted on an air interface,
wherein the base station controller is configured to control operations of the notification procedure processing unit, the radio bearer allocating unit and the state information assembling unit and determine whether to initiate an RB allocation procedure in each of the managed cells and whether to transmit the state information of the multimedia broadcast/multicast service based on the received MBMS Session Start message or MBMS Session Update message and the stored mapping relationship.

21. The base station according to claim 19, wherein the MBMS Session Start message includes a service ID, a service type, an SA, and a list of tracking areas (TAs) hosting user equipment(s) (UE/UEs) which is/are in idle state and has/have subscribed to the MBMS.

22. The base station according to claim 21, wherein the MBMS Session Start message further includes a dedicated carrier ID.

23. The base station according to claim 21, wherein the service type comprises broadcast and multicast.

24. The base station according to claim 20, further comprising:
an Internet Protocol (IP) multicast group processing unit connected to the radio bearer allocating unit and configured to determine whether the base station has joined an IP multicast group of the current MBMS after the RB is allocated and make an application for joining the IP multicast group to the aGW if the based station has not joined the group.

25. The base station according to claim 20, wherein the base station controller is configured to determine whether to allocate an RB to each of the cells based on the result of the notification procedure.

26. A method of operating an Evolved Multimedia Broadcast/Multicast Service (EMBMS) base station supporting network multicast, comprising steps of:
receiving a Multimedia Broadcast/Multicast Service (MBMS) Session Start message and an MBMS Session Update message from an access gateway (aGW), and returning a response message to the aGW; and
with respect to each of cells managed by the base station, carrying out the following operations based on the received MBMS Session Start message and MBMS Session Update message and a stored mapping relationship:
determining whether it is necessary to initiate a notification procedure in this cell, and initiating the notification procedure if it is necessary and waiting for a result of the notification procedure;

determining whether it is necessary to allocate a radio bearer (RB) to this cell;

allocating the RB to this cell, if it is necessary, and informing a user equipment (UE) of the RB configuration information; and determining whether it is necessary to transmit state information of the multimedia broadcast/multicast service if it is not necessary to allocate an RB to this cell, and transmitting the state information if it is necessary.

27. The method according to claim 26, wherein the MBMS Session Start message includes a service ID, a service type, an SA, and a list of tracking areas (TAs) hosting user equipment(s) (UE/UEs) which is/are in idle state and has/have subscribed to the MBMS.

28. The method according to claim 27, wherein the MBMS Session Start message further includes a dedicated carrier ID.

29. The method according to claim 27, wherein the service type comprises broadcast and multicast.

30. The method according to claim 26, further comprising:

determining, after the RB is allocated, whether the base station has joined an IP multicast group of the current MBMS, and making, if it has not joined the group, an application for joining the IP multicast group to the aGW.

31. The method according to claim 26, wherein whether it is necessary to allocate an RB to each of the cells is determined based on the result of the notification procedure.

* * * * *